May 13, 1930.  T. T. GREENWOOD  1,758,253
BRAKE
Filed Sept. 30, 1927

Inventor,

Patented May 13, 1930

1,758,253

UNITED STATES PATENT OFFICE

TALMA T. GREENWOOD, OF EAST TEMPLETON, MASSACHUSETTS

BRAKE

Application filed September 30, 1927. Serial No. 223,163.

This invention relates to brakes and especially to automobile brakes and brake linings.

An automobile brake is subject to various weather conditions and should function equally well in wet weather as in dry weather. It is a fact, however, that the usual automobile brake, when wet, does not have the retarding effect that it does when dry, or the brake slips, and will not "take hold." Under some conditions, water on the brakes renders them practically completely inoperative.

In accordance with the present invention, I provide a brake, and especially a friction lining for one of the two cooperating brake members, which has a friction, or brake, surface composed of at least two sections or materials, which have opposite characteristics, one section or material being characterized by having reduced friction when wet and the other section characterized by having increased friction when wet; and both sections or materials being present in the braking surface in such proportions that the increased wet friction of one substantially compensates for the reduced wet friction of the other, thus providing a brake which is substantially unaffected by water.

The selection of two suitable materials is not difficult. In general, I find that the coefficient of friction between fibrous materials and a metal is reduced when the engaging surfaces are wet, while the coefficient of friction between metals is enhanced under the same conditions. As a practical embodiment of my invention, therefore, the brake can consist of a rotatable metal drum, as is common with automobile brakes, with the cooperating stationary member having a lining, or friction face, which is composed in part of fibrous material, as asbestos, for instance, and in part of a metal, as copper, in the form of a ribbon or wire, for instance, and with the exposed friction surfaces of the fibrous material and of the metal in such relative proportions that the braking effect is substantially the same whether the brake is wet or dry. The precise proportions of metal and fibrous material cannot be definitely stated since the proportions will vary with different materials. As a matter of illustration, however, it can be stated that in a composite brake of leather and copper, bearing on an iron drum, and with the leather area considered as unity, the copper area will be about forty-five per cent of the leather area.

The manner of making the brake, or the lining, embodying this invention is not important herein.

In the figures, the rotary, pressed-steel brake drum 10 is surrounded by a resilient steel band 12 which has riveted to its inner face a brake lining 14 embodying this invention, which lining is adapted to be brought into engagement with the drum when the brake-operating mechanism 16 is suitably operated.

Figure 1:
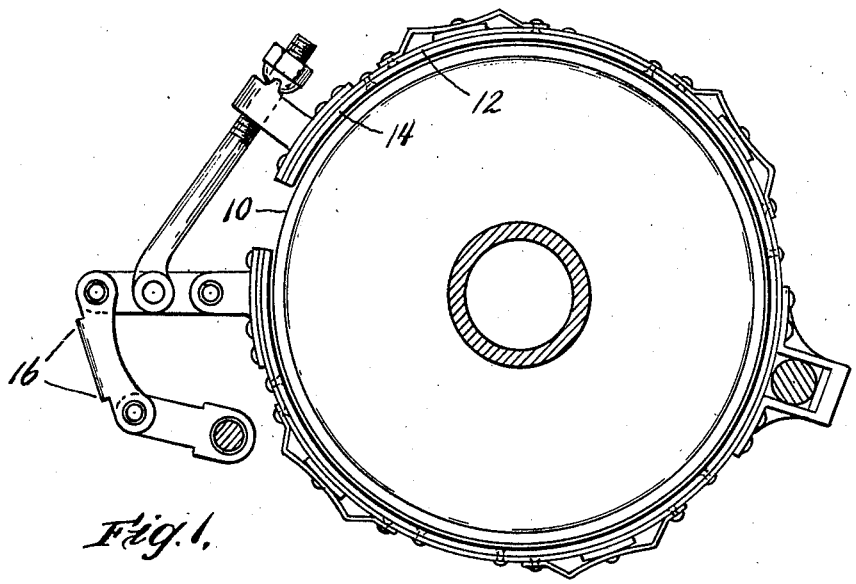
Fig. 1 is a sectional elevation through a conventional brake having a lining embodying the invention.
Figure 2:
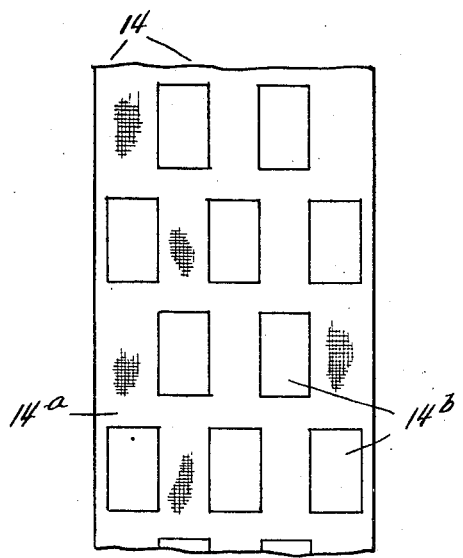
Fig. 2 is a plan detail of the friction face of the brake lining.

The friction, or drum-engaging face of the lining, constructed in accordance with this invention, as shown in Fig. 2, consists of a section $14^a$ which may be composed of a fibrous material, as asbestos, while the sections $14^b$ may be composed of metal, as a copper ribbon or wire interwoven or otherwise connected with the fibrous material and flush with the friction face thereof so that both engage the brake drum conjointly. The proportions of metal surfaces $14^b$ to the fibrous surface $14^a$ is such that the decreased friction of the fibrous surface is compensated by the increased friction of the metal surface, when wet, so that the frictional effect of the composite surface is practically the same, wet or dry.

Figure 3:
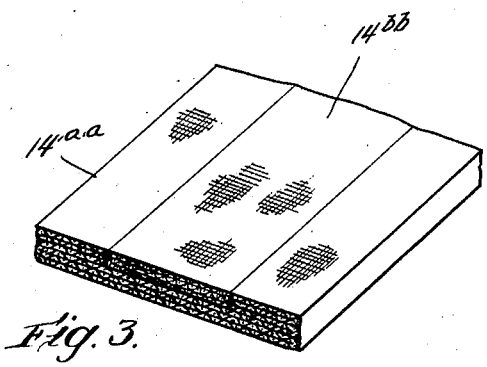
Fig. 3 is a perspective detail of a modified form of brake lining.

In Fig. 3 the brake lining is composed of two fibrous sections $14^{aa}$ on opposite sides of a central metal section $14^{bb}$. In this case the fibrous sections can be of the usual woven structure and the central section can be of woven metal wire, or gauze.

While I have herein specifically mentioned copper for the material having an increased coefficient of friction when its friction face is wet, other metals, lead, for instance, can be employed or any material having the requisite characteristics and that does not score or cut the brake drum or equivalent brake-member.

I claim:

1. A friction lining for a brake having a friction face composed of two materials characterized by one having decreased and the other increased frictional effect when wet and present in such proportions that the combined frictional effect is practically the same whether the lining is wet or dry.

2. A friction lining for a brake having a friction face composed of two materials characterized by one having decreased and the other increased frictional effect when subject to an abnormal condition and present in such proportions that the combined frictional effect is practically the same whether or not subject to such abnormal condition.

3. A friction lining for a brake having a friction face composed of a fibrous material and a metal in such relative proportions that the frictional effect is substantially uninfluenced by water.

4. A brake lining constructed of different materials in such proportions that the functional effect of the lining is the same when wet as when dry.

In testimony whereof, I have signed my name to this specification.

TALMA T. GREENWOOD.